United States Patent

(12) United States Patent (10) Patent No.: US 8,494,737 B2
Maier et al. (45) Date of Patent: Jul. 23, 2013

(54) METHOD FOR CONTROLLING THE DRIVING MODE OF A MOTOR VEHICLE

(75) Inventors: Alexander Maier, Friedrichshafen (DE); Maik Wurthner, Markdorf (DE); Joachim Staudinger, Memmingen (DE); Johannes Kemler, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/704,289

(22) PCT Filed: May 4, 2011

(86) PCT No.: PCT/EP2011/057116
§ 371 (c)(1),
(2), (4) Date: Dec. 14, 2012

(87) PCT Pub. No.: WO2011/160878
PCT Pub. Date: Dec. 29, 2011

(65) Prior Publication Data
US 2013/0096792 A1 Apr. 18, 2013

(30) Foreign Application Priority Data
Jun. 22, 2010 (DE) .......................... 10 2010 030 346

(51) Int. Cl.
*G06F 7/00* (2006.01)
(52) U.S. Cl.
USPC ......................................................... 701/65
(58) Field of Classification Search
None
See application file for complete search history.

(56) References Cited
U.S. PATENT DOCUMENTS
4,361,060 A * 11/1982 Smyth .............................. 477/78

6,939,265 B2 9/2005 Rustige et al.
7,972,242 B2 * 7/2011 Cullen et al. ................... 477/107
2011/0287892 A1 * 11/2011 Cullen et al. ................... 477/107

FOREIGN PATENT DOCUMENTS

| DE | 102 21 701 A1 | 11/2002 |
| DE | 10 2006 054 327 A1 | 5/2005 |
| DE | 10 2004 017 115 A1 | 10/2005 |
| DE | 10 2008 015 046 A1 | 9/2008 |
| DE | 10 2007 036 794 A1 | 2/2009 |
| DE | 10 2008 023 135 A1 | 11/2009 |
| WO | 2008/113836 A1 | 9/2008 |

OTHER PUBLICATIONS

German Search Report Corresponding to DE 10 2010 030 346.1.
International Search Report Corresponding to PCT/EP2011/057116.
Written Opinion Corresponding to PCT/EP2011/057116.

* cited by examiner

*Primary Examiner* — Thomas Tarcza
*Assistant Examiner* — Adam Alharbi
(74) *Attorney, Agent, or Firm* — Davis & Bujold, PLLC

(57) ABSTRACT

A method of controlling the driving mode of a motor vehicle, having a largely automated drive-train including a drive motor, a transmission and a separator clutch arranged between the motor and transmission, such that while driving, if certain operating conditions exist and a speed profile calculated with reference to topographical data and vehicle parameters for a road section lying ahead is suitable, the drive-train is disengaged and driving continues in a coasting mode until the occurrence of a termination signal. To enable coasting operation, the calculated speed profile for the case of immediate opening of the drive-train is determined continually at equidistant successive travel points along the driving stretch and is, in each case, evaluated in relation to lower and upper speed limits. Coasting is only enabled if, for a specified minimum number of successive travel points, the evaluation result is in each case positive.

20 Claims, 3 Drawing Sheets

METHOD FOR CONTROLLING THE DRIVING MODE OF A MOTOR VEHICLE

This application is a National Stage completion of PCT/EP2011/057116 filed May 4, 2011, which claims priority from German patent application serial no. 10 2010 030 346.1 filed Jun. 22, 2010.

FIELD OF THE INVENTION

The invention concerns a method for controlling the driving mode of a motor vehicle, whose drive-train is largely automated and comprises a drive motor in the form of an internal combustion engine, an incrementally or continuously adjustable transmission and, arranged between the drive motor and the transmission, at least one separator clutch, such that while driving, when certain operating conditions exist and a speed profile calculated with reference to the topographical data and vehicle parameters for a route section lying ahead is suitable, the drive-train is opened and driving continues in a coasting operating mode until the occurrence of a termination signal.

BACKGROUND OF THE INVENTION

In general, during the development of new motor vehicles and the further development of existing motor vehicles, in particular also commercial vehicles, an aim is to reduce fuel consumption and the emissions of pollutants and $CO_2$. Besides technical optimization of the vehicles, such as the development of low-consumption and low-emission drive motors, efficiency-optimized multi-stage transmissions, tires with low rolling resistance and aerodynamically shaped bodies, truck driver cabins and truck superstructures, there is a further possibility for reducing fuel consumption and pollutant and $CO_2$ emissions, namely by suitable control of the driving mode during the use of the motor vehicles.

For this, it can be provided that while driving under suitable operating conditions, a motor vehicle can be operated temporarily in the so-termed rolling mode or in the so-termed coasting mode. In rolling operation the drive-train remains closed, i.e. the gear engaged in the transmission remains engaged, the transmission ratio set remains set, and the separator clutch remains engaged. Only the fuel supply to the drive motor is cut off. Since in such a case the drive motor changes to drag operation and the drag torque of the drive motor therefore acts as a braking force on the drive wheels, more prolonged rolling operation is in practice only possible when moving along a slightly downhill stretch, driving over the brow of a hill and driving through a depression, when the downhill propulsion force acting on the motor vehicle, at least averaged over time, is to a large extent compensated for by the rolling resistance of the motor vehicle and the braking force of the drive motor.

In contrast, during coasting operation the drive-train is opened, which can be done by disengaging the separator clutch and/or by engaging the neutral setting in the transmission. The drive motor is then for the most part operated in the idling mode, but provided it is not needed for powering safety-relevant and/or comfort-relevant aggregates such as the servo-pump of a servo-steering system or the compressor of an air-conditioning unit, it can also be switched off entirely. Since in that case there is no drive motor drag torque, a longer unpowered propulsion phase or coasting operation is possible more frequently and on various road profiles.

In general however, besides the basic current operating conditions that must be met for the initiation of coasting operation, it is difficult to define, measure and evaluate road-stretch-specific criteria which allow a transition to coasting operation to seem appropriate having regard to economic and comfort-orientated considerations. The current conditions to be met for coasting operation include a running drive motor, a current driving speed higher than a defined minimum speed, the absence of a demand for acceleration (accelerator pedal not actuated and/or no engine torque demand from an activated cruise control), the absence of a deceleration demand (brake pedal not actuated and/or no braking torque demand from an activated cruise control), and if necessary also a current road inclination between a maximum permitted downhill slope and a maximum permitted uphill slope.

Conditions related to this are known, for example, from DE 102 21 701 A1 which describes a method for controlling the driving mode of a motor vehicle, with which a speed adaptation of the drive motor is intended to enable a rapid and largely smooth termination of a coasting operation. Since fulfilling of the conditions alone is not sufficient for a longer and economically worthwhile coasting operation, at least one further criterion must be fulfilled, which relates to a road section lying directly ahead of the motor vehicle, along which there is a high probability that the vehicle is about to drive.

DE 10 2004 017 115 A1 describes a method for controlling the driving mode of a motor vehicle during the operation of a speed regulation unit, in which with the drive-train closed the motor vehicle is periodically accelerated by the drive motor to an upper speed limit above the nominal speed and then, in rolling or coasting operation, decelerated to a lower speed limit below the nominal speed. When the road slopes down steeply the motor vehicle is slowed down in rolling operation, i.e. with its drive-train closed and the fuel supply to the drive motor cut off. If the road slopes downhill less steeply the motor vehicle is slowed down in coasting operation, i.e. with the drive-train open, and stopping of the drive motor is only provided for if the expected duration of the deceleration phase exceeds a specified length of time or if the motor vehicle is immediately before a steep downhill stretch. For controlling the sequence of acceleration and deceleration phases in a manner optimized for consumption and emissions, topographical parameters should also be taken into account.

In contrast, DE 10 2006 054 327 A1 discloses a method for controlling the driving mode of a motor vehicle, according to which the current vehicle position and the current driving speed of the motor vehicle are noted and processed with reference to data of a digital road map, in particular with road inclinations and speed limits of road sections ahead of the motor vehicle, in order to determine an optimum starting point for initiating a coasting operation. By pre-calculating the rolling speed during coasting operation, the starting point for initiating the coasting operation should be determined such that statutory speed limits associated with road sections laying ahead can be complied with out actuating a brake (service brake or retarder).

Finally, DE 10 2008 023 135 A1 describes a method for controlling the driving mode of a motor vehicle, according to which, during driving the current driving speed of the motor vehicle, vehicle parameters that represent the rolling properties of the vehicle and topographical data of the road stretch are determined continually, and from these the speed profile expected within a road stretch lying ahead while in rolling operation, i.e. with the drive-train closed and the fuel supply to the drive motor cut off, is calculated. Depending on the speed profile concerned relative to a maximum speed and a minimum speed, it is decided whether to begin, block or terminate rolling operation. From the calculated speed profile the brow of a hill or a depression can be recognized and the beginning of rolling operation is determined in such manner that the vehicle can travel over a brow of a hill without its speed falling below the minimum speed and through a depression without exceeding the maximum speed, in each case during rolling operation, and so that the rolling speed at the end of rolling operation corresponds largely to the driving speed at the beginning of rolling operation or to the nominal speed set by an activated speed regulation unit.

However, the methods mentioned above all deal only with partial aspects of the initiation or termination of the rolling or coasting operation of a motor vehicle. Likewise, the definition of the limiting or minimum and maximum speeds used for evaluating the speed profile calculated in each case, is unclear. A further disadvantage of the known methods is that they each provide for comparatively fixed criteria for the initiation and termination of rolling or coasting operation, which make no allowance for the occurrence of abrupt changes of the calculated speed profile that can be caused by signal scatter and signal interference. The result can be that a rolling or coasting operation is started and terminated again several times in brief alternation, which substantially reduces the possible energy saving and impairs the driving comfort.

SUMMARY OF THE INVENTION

Accordingly, the purpose of the present invention is to introduce a method for controlling the driving mode of a motor vehicle, of the type mentioned at the start, by virtue of which criteria improved in relation to economy and comfort orientation are provided for the enabling and blocking of coasting operation of the motor vehicle.

This objective is achieved in that the speed profile $v_F(x_{FS})$ calculated for the case of immediate opening of the drive-train is determined continually at successive, equidistant travel points along the route $x_{FS}$ and is in each case evaluated in relation to a lower speed limit $v_{Gr\_U}$ and an upper speed limit $v_{Gr\_O}$, and coasting operation is only enabled if the evaluation result is in each case positive for a specified minimum number $n_{X\_Min}$ of successive travel points.

Thus, the invention begins with a motor vehicle, for example a commercial vehicle, whose drive-train is largely automated and comprises a drive motor in the form of an internal combustion engine, an incrementally or continuously adjustable transmission, and at least one separator clutch arranged between the drive motor and the transmission. To reduce farther the fuel consumption and the pollutant and $CO_2$ emissions of such a motor vehicle, if certain operating conditions exist during driving and if there is a suitable speed profile $v_F(x_{FS})$, calculated with reference to topographical data and vehicle parameters for a road section lying ahead, the drive-train is opened and driving continues in the coasting mode, i.e. with a drive motor idling or switched off completely, until the occurrence of a termination signal.

Since, in particular because of inaccurate or partially missing elevation data concerning the road section ahead, the calculated speed profile $v_F(x_{FS})$ can be affected by certain inaccuracies and abrupt changes, according to the invention it is provided that the spontaneous commencement of coasting operation based on the occurrence of a first positive evaluation of the calculated speed profile $v_F(x_{FS})$ is prevented. Instead, coasting operation is only enabled if the evaluation result for a specified minimum number $n_{X\_Min}$, of successive equidistant travel points, at which the calculation and evaluation of the speed profile $v_F(x_{FS})$ is repeated, is in each case positive.

This results in a kind of 'smoothing' or damping function, such that coasting operation is not started and ended again repeatedly owing to varying evaluation results, but is only started when this is appropriate in terms of economic and comfort-orientated aspects, i.e. when coasting operation can in all probability be maintained over a certain driving distance or driving time. This objective is also assisted by suitable evaluation criteria of the speed profile $v_F(x_{FS})$ calculated in each case, which will be explained in more detail below.

For the method according to the invention to be automatically adapted for a variety of road-section profiles, it is expediently provided that the minimum number $n_{X\_Min}$ of successive travel points for enabling coasting operation is determined variably as a function of the elevation profile of the road section lying ahead and/or of the speed profile $v_F(x_{FS})$ calculated for it.

Since when starting off on a downhill slope or at the beginning of a depression it is best to open the drive-train as early as possible so as to make optimum use of the kinetic energy of the motor vehicle, it is advantageous to reduce the minimum number of successive travel points $n_{X\_Min}$ for enabling coasting operation starting from a standard value, if starting off on a downhill slope or the beginning of a depression is recognized on the basis of the elevation profile of the road section ahead and/or of the speed profile $v_F(x_{FS})$ calculated from it.

During operation using the accelerator pedal it is expedient to use a speed lower than the current driving speed $v_F(0)$ by a specified lower speed difference $\Delta v_U$ as the lower speed limit ($v_{Gr\_U}=v_F(0) \Delta v_U$) and a speed higher than the current driving speed $v_F(0)$ by a specified upper speed difference $\Delta v_O$ as the upper speed limit ($v_{Gr\_O}=v_F(0)+\Delta v_O$), wherein the lower speed difference $\Delta v_U$ and the upper speed difference $\Delta v_O$ can optionally be made the same size or of different sizes.

During cruise control operation or operation with a speed regulation system, i.e. with a cruise control which is activated as such but which is inactive during the coasting mode because the drive-train is open, the speed at which the cruise control would call for an engine torque is used as the lower speed limit $v_{Gr\_U}$ and the speed at which the cruise control would call for a braking torque is used as the upper speed limit $v_{Gr\_O}$.

When determining the lower speed limit $v_{Gr\_U}$ or the upper speed limit $v_{Gr\_O}$, the speed at which the cruise control would call for an engine torque or, respectively, the speed at which the cruise control would call for a braking torque can be modified, respectively, by the addition or subtraction of a parameterizable offset value.

If a statutory speed limit $v_{Lim}$ begins within the road section lying ahead, it is appropriate for at least the upper speed limit $v_{Gr\_O}$ to be lowered uniformly over an adaptation stretch $\Delta x_{Mod}$ to the statutory speed limit $v_{Lim}$ if the latter is below the upper speed limit ($v_{Lim}<v_{Gr\_O}$).

However, if the statutory speed limit $v_{Lim}$ is also lower than the lower speed limit ($v_{Lim}<v_{Gr\_U}$), then the latter too would have to be lowered in a suitable way. A statutory speed limit $v_{Lim}$ in the road section lying ahead can be noted from a digital road map or recognized in good time by the recognition of corresponding traffic signs by an environment monitoring device. Furthermore, zones with a statutory speed limit $v_{Lim}$ such as urban driving, stretches with numerous curves or road-work zones, can be learned by repeatedly driving through such stretches, and stored in a suitable manner.

The evaluation result of the calculated speed profile $v_F(x_{FS})$ is positive if, within the road section lying ahead, the calculated speed profile $v_F(x_{FS})$ does not fall below the lower speed limit $v_{Gr\_U}$ or exceed the upper speed limit $v_{Gr\_O}$, which corresponds to an ideal coasting operation of the motor vehicle with largely constant driving speed, i.e. on a road that slopes slightly downhill. Otherwise, the evaluation result of the calculated speed profile $v_F(x_{FS})$ is negative.

According to the invention, however, the evaluation result of the calculated speed profile $v_F(x_{FS})$ is also positive if, within the road section lying ahead, the calculated speed profile $v_F(x_{FS})$ falls below the lower speed limit $v_{Gr\_U}$ and then rises above it again, provided that the falling below does not occur through more than a specified, tolerable number $n_{X\_Tol\_U}$ of successive travel points and is within a specified, tolerable speed difference $\Delta v_{Tol\_U}$. The result of the positive evaluation in such a case is that the vehicle can drive all the way over a small brow of a hill in the coasting mode without losing too much time because of this or, at a largely constant driving speed, without holding up motor vehicles behind it.

Likewise, the evaluation result of the calculated speed profile $v_F(x_{FS})$ can also be regarded as positive if, within the road section lying ahead, the calculated speed profile $v_F(x_{FS})$ exceeds the upper speed limit $v_{Gr\_O}$ and then falls below it again, provided that it does not exceed the limit through more than a specified, tolerable number $n_{X\_Tol\_O}$ of successive travel points, and that the excess is within a specified, tolerable speed difference $\Delta v_{Tol\_O}$. The result of the positive evaluation in such a case is that the vehicle can drive through a depression in the coasting mode without moving too fast and, with its largely constant driving speed, without perhaps getting too close to motor vehicles driving ahead of it.

However, the evaluation result of the calculated speed profile $v_F(x_{FS})$ can also be positive if, with a negative gradient of the calculated speed profile $v_F(x_{FS})$, i.e. when the motor vehicle is slowing down, at the end of the road section ahead the speed profile $v_{XP}(x_{FS})$ extrapolated linearly beyond the last travel point of the road section ahead only exceeds the lower speed limit $v_{Gr\_U}$ above a specified minimum number $n_{XP\_Min\_U}$ of successive travel points. The application of this criterion is appropriate when reliable topographical data are available only for a shorter road section ahead. By extrapolating the calculated speed profile $v_F(x_{FS})$ this road section is extended forward and thus makes possible an evaluation comparable to one for a calculated speed profile $v_F(x_{FS})$ covering a longer road section ahead.

Likewise, the evaluation result of the calculated speed profile $v_F(x_{FS})$ can also be regarded as positive if, with a positive gradient of the calculated speed profile $v_F(x_{FS})$, i.e. when the motor vehicle is accelerating, at the end of the road section ahead the speed profile $v_F(x_{FS})$ extrapolated linearly beyond the last travel point of the road section evaluated only exceeds the upper speed limit $v_{Gr\_O}$ above a specified minimum number $n_{XP\_Min\_O}$ of successive travel points.

However, the evaluation result of the calculated speed profile $v_F(x_{FS})$ can also be positive if, within the road section lying ahead, the calculated speed profile $v_F(x_{FS})$ falls below the lower speed limit $v_{Gr\_U}$ for above a specified minimum number $n_{X\_Min\_U}$ of successive travel points. The result of applying this criterion is that coasting operation is also possible over a driving stretch which is shorter than the road section upon which the calculation of the speed profile $v_F(x_{FS})$ is based.

Likewise, the evaluation result of the calculated speed profile $v_F(x_{FS})$ can be regarded as positive if, within the road section lying ahead, the calculated speed profile $(v_F(x_{FS}))$ falls below the upper speed limit $(v_{Gr\_O})$ above a specified minimum number $n_{X\_Min\_O}$ of successive travel points.

In the context of the invention it is understood that in place of the previously mentioned numbers ($n_{X\_Tol\_U}$, $n_{X\_Tol\_O}$, $n_{XP\_Min\_U}$, $n_{XP\_Min\_O}$, $n_{X\_Min\_U}$, $n_{X\_Min\_O}$) of successive travel points, the corresponding part-stretches containing those travel points or corresponding driving times which the vehicle drives through the travel points or part-stretches can also be used.

Under normal operating conditions, i.e. without the occurrence of an engine torque demand or braking torque demand, which can be initiated when the driver actuates, respectively, the accelerator pedal or the brake pedal, or by a cruise control in standby operation with monitoring of the surroundings (distance regulation), the coasting mode is terminated if the current, actual driving speed $v_F$ or the calculated speed profile $v_F(x_{FS})$ reaches the lower speed limit $v_{Gr\_U}$ or the upper speed limit $v_{Gr\_O}$.

However, to avoid a marked decrease of the driving speed $v_F$ after the termination of coasting operation, even before the lower speed limit $v_{Gr\_U}$ is reached by the calculated speed profile $v_F(x_{FS})$ the coasting mode is terminated if, with reference to the elevation profile of the road section lying ahead and/or the speed profile $v_F(x_{FS})$ calculated therefrom, an uphill drive or the end of a depression is recognized.

Likewise, the driving speed can be prevented from being too low or too high after the termination of coasting operation by terminating the coasting operation even before the calculated speed profile $v_F(x_{FS})$ reaches the lower speed limit $v_{Gr\_U}$ or the upper speed limit $v_{Gr\_O}$, if the intersection gradient $dv_F/dt$ of the calculated speed profile $v_F(x_{FS})$, i.e. the gradient of the speed profile $v_F(x_{FS})$ when it reaches the lower speed limit $v_{Gr\_U}$ or the upper speed limit $v_{Gr\_O}$, falls below a specified deceleration limit value $(dv_F/dt)_{Max\_U}$, or exceeds a specified acceleration limit value $(dv_F/dt)_{Max\_O}$.

If on the basis of the calculated speed profile $v_F(x_{FS})$ the coasting operation is expected to extend over more than a specified reference number $n_{X\_Ref}$ of successive travel points, then in order to reduce the drag torque of the drive-train it is advantageous to shift the transmission into neutral when the coasting mode begins.

As a difference from this, if a coasting operation is expected to extend over fewer than the specified reference number $n_{X\_Ref}$ of successive travel points, to accelerate the control sequence for terminating the coasting mode it is advantageous to open only the separator clutch when coasting begins.

To enable a forward-looking control sequence of the coasting mode, in each case the speed profile $v_F(x_{FS})$ is determined for a road section ahead of length, for example, 300 meters to 500 meters, preferably for a section ahead 400 meters long.

In this, in order to achieve sufficient accuracy of the calculated speed profile $v_F(x_{FS})$ and a rapid and at the same time reliable evaluation basis, the calculated speed profile $v_F(x_{FS})$ is repeated at equidistant road stretch intervals, for example between 3 meters and 5 meters long, and preferably at road stretch intervals of 4 meters.

BRIEF DESCRIPTION OF THE DRAWINGS

For the further illustration of the invention a drawing with example embodiments is attached to the description. The drawings show.

DETAILED DESCRIPTION OF THE PREFERRED EMBODIMENTS

Below, the essential characteristics of the method according to the invention for enabling and terminating coasting operation of a motor vehicle are explained with reference to diagrams, each of which shows in part a) a profile of the road inclination $\alpha_{FB}(x_{FS})$ determined from topographical elevation data of a road section lying ahead of the motor vehicle, and in part b) a speed profile $v_F(x_{FS})$ calculated from that, in each case the current position of the motor vehicle being at $x_{FS}=0$.

The elevation data of the road section ahead are determined continually, in this case for example at intervals of 4 meters, for a travel point located 400 meters ahead of the vehicle, which can be done for example in combination with the location of the current position of the vehicle by means of a satellite positioning system (GPS, Galileo) by reading out the corresponding elevation data from a digital street map. Thus, together with the previously determined elevation data there are available in each case a total of 100 elevation data for a road section 400 meters long ahead of the vehicle, from which, in a manner known as such, the profile of the road inclination $\alpha_{FB}(x_{FS})$ is determined and from it, using the current speed $v_F(0)$ of the vehicle, the vehicle's mass, the rolling resistance coefficient and the air resistance coefficient of the vehicle, on the assumption of an immediate opening of the drive-train, the speed profile $v_F(x_{FS})$ in the coasting mode is calculated and assigned to each road section that lies ahead.

The speed profiles $v_F(x_{FS})$ determined continually in this way are each evaluated in relation to a lower speed limit $v_{Gr\_U}$ and an upper speed limit $v_{Gr\_O}$ with a view to enabling a coasting operation, these limits being indicated in the figures by dot-dash lines. However, coasting operation is only enabled if, for a specified minimum number $n_{X\_Min}$ of successive travel points, the evaluation result is in each case positive. The result of this is that the calculation of the speed profile $v_F(x_{FS})$ based on partially inaccurate or entirely missing elevation data only enables the coasting mode if the probability is high that coasting can be maintained over a certain driving distance or driving time, and is therefore economically appropriate.

The speed limits $v_{Gr\_U}$, $v_{Gr\_O}$ used for evaluating the calculated speed profile $v_F(x_{FS})$ are expediently determined during accelerator pedal operation in relation to the current driving speed $v_F(0)$ ($v_{Gr\_U}=v_F(0)-\Delta v_U$, $v_{Gr\_O}=v_F(0)+\Delta v_O$), and during cruise control operation as the speed at which an engine torque is called for by the cruise control ($v_{Gr\_U}$) or the speed at which a braking torque is called for by the cruise control ($v_{Gr\_O}$).

Figure 1:
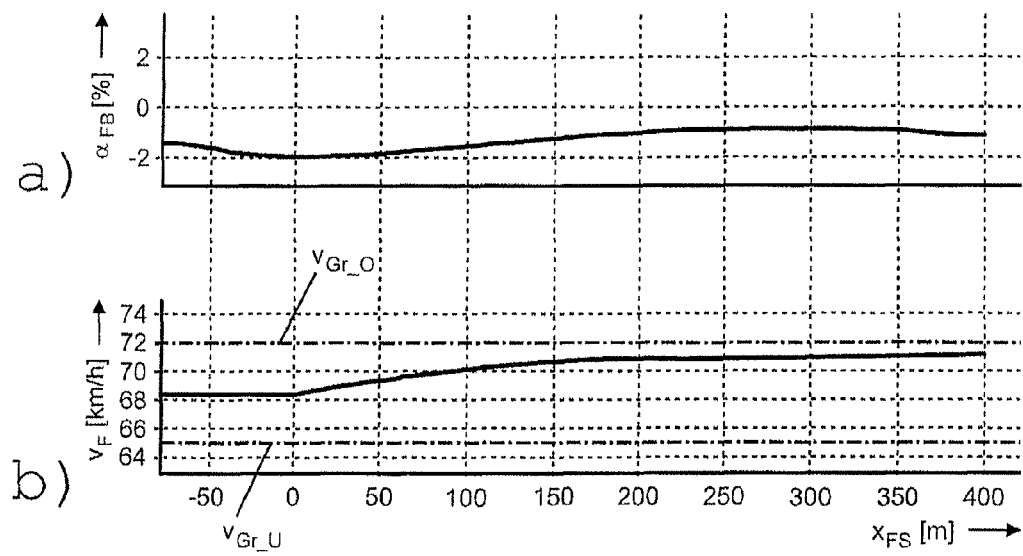
FIG. 1: An inclination profile of a road section lying ahead (FIG. 1a) and a speed profile calculated therefrom (FIG. 1b) with a first evaluation criterion for enabling coasting operation.

Now, FIG. 1 shows a road inclination profile $\alpha_{FB}(x_{FS})$ and a speed profile $v_F(x_{FS})$ calculated from it, in which the driving speed $v_F(x_{FS})$ remains within the speed window delimited by the speed limits $v_{Gr\_U}$, $v_{Gr\_O}$ throughout the whole of the road section lying ahead ($x_{FS}=0$-400 meters), which leads to a positive evaluation result.

Figure 2:
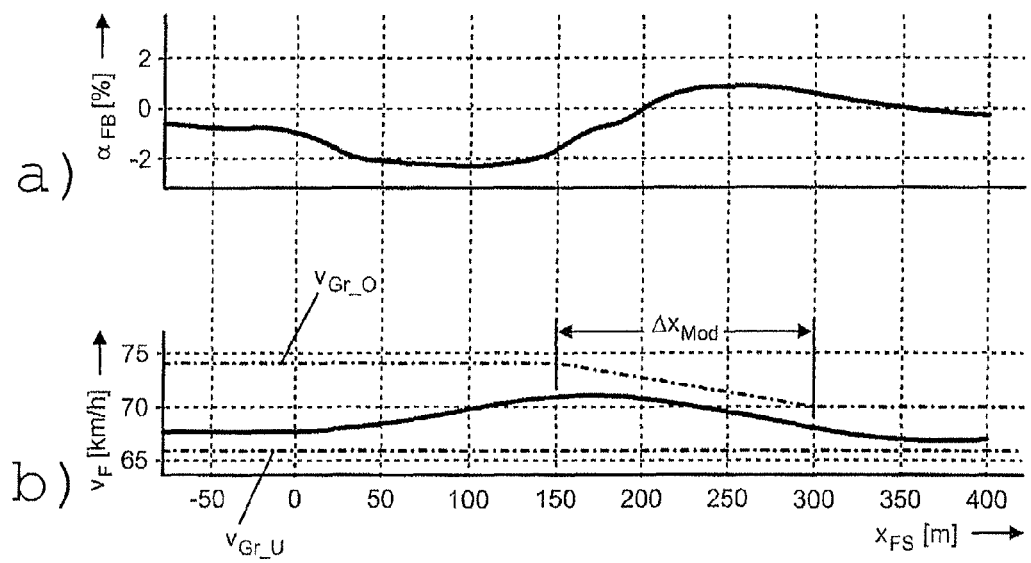
FIG. 2: An inclination profile of a road section ahead, with a statutory speed limit (FIG. 2a) and a speed profile calculated therefrom (FIG. 2b)

FIG. 2 illustrates as an example that the speed limits $v_{Gr\_U}$, $v_{Gr\_O}$ do not necessarily have to be constant over the road section lying ahead. In this case, within the road section lying ahead, namely 300 meters ahead of the motor vehicle, a statutory speed limit of 70 km/h begins. The corresponding information can be obtained for example from a digital road map or by the recognition of the relevant traffic sign by means of a surroundings monitoring device. To adapt the method, over an adaptation distance $\Delta x_{Mod}$ of 150 m before the beginning of the statutory speed limit the upper speed limit $v_{Gr\_O}$ is lowered linearly to the level of the 70 km/h speed limit. Since in this example too the driving speed $v_F(x_{FS})$ throughout the road section lying ahead ($x_{FS}=0$-400 meters) again remains within the speed window delimited by the speed limits $v_{Gr\_U}$, $v_{Gr\_O}$, the evaluation result is positive in this case as well.

Figure 3:
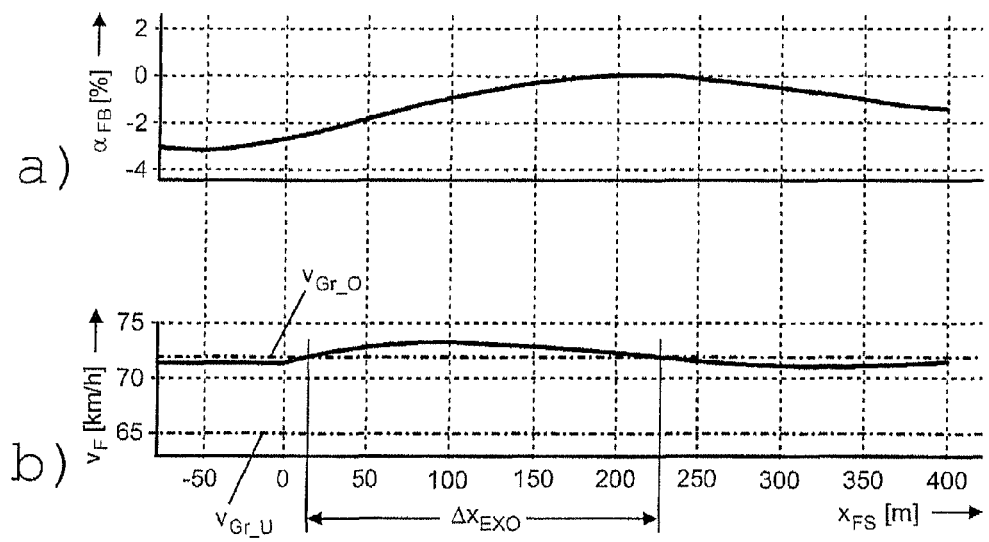
FIG. 3: An inclination profile of a road section lying ahead (FIG. 3a) and a speed profile calculated therefrom (FIG. 3b), with a second evaluation criterion for enabling coasting operation.

In FIG. 3, within the road section ahead the calculated speed profile $v_F(x_{FS})$ exceeds the upper speed limit $v_{Gr\_O}$ and falls below it again after remaining above it over a stretch $\Delta x_{EXO}$. Such a speed profile is typical when driving through a slight depression, in which coasting operation can still be appropriate despite the exceeding of the upper speed limit $v_{Gr\_O}$. Accordingly, in this case too the evaluation result of the calculated speed profile ($v_F(x_{FS})$) is positive provided that the excess speed is not maintained for more than a specified tolerable number $n_{X\_Tol\_O}$ of successive travel points and also provided that the excess speed is within a specified tolerable speed difference $\Delta v_{Tol\_O}$.

Figure 4:
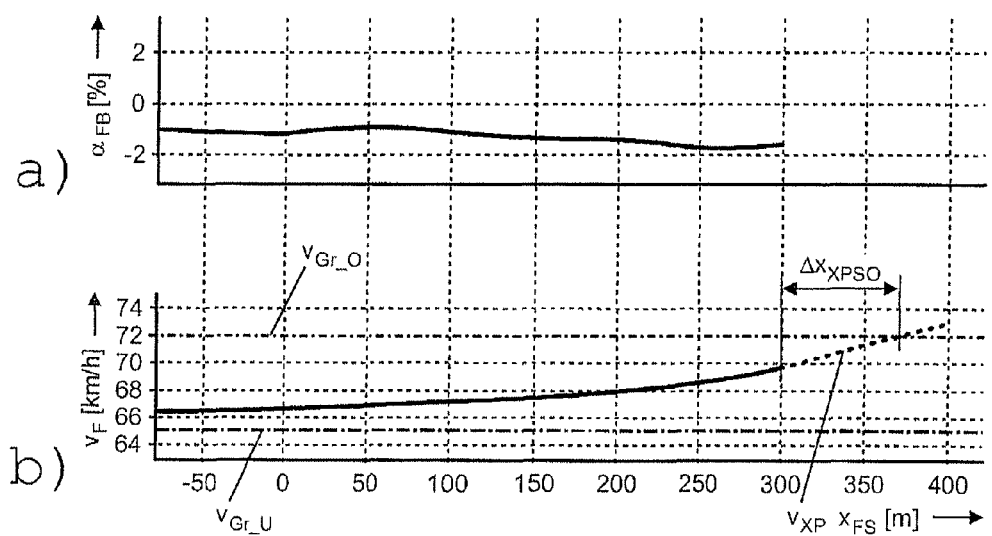
FIG. 4: An inclination profile of a road section lying ahead (FIG. 4a) and a speed profile calculated therefrom (FIG. 4b) with a third evaluation criterion for enabling coasting operation.

In FIG. 4 the road inclination profile $\alpha_{FB}(x_{FS})$ and the speed profile $v_F(x_{FS})$ calculated from it extend only over a road section ahead of 300 meters, for example because further topographical data are inaccurate or not available. In this case the calculated speed profile ($v_F(x_{FS})$) is extrapolated linearly beyond the last travel point of the road section ahead until, owing to its positive gradient, the extrapolated speed profile $v_{XP}(x_{FS})$ reaches or exceeds the upper speed limit $v_{Gr\_O}$ after an extrapolated part-stretch $\Delta x_{XPSO}$. If this takes place below a specified minimum number $n_{XP\_Min\_O}$ of successive travel points, the evaluation result of the calculated speed profile $v_{XP}(x_{FS})$ is also positive.

Figure 5:
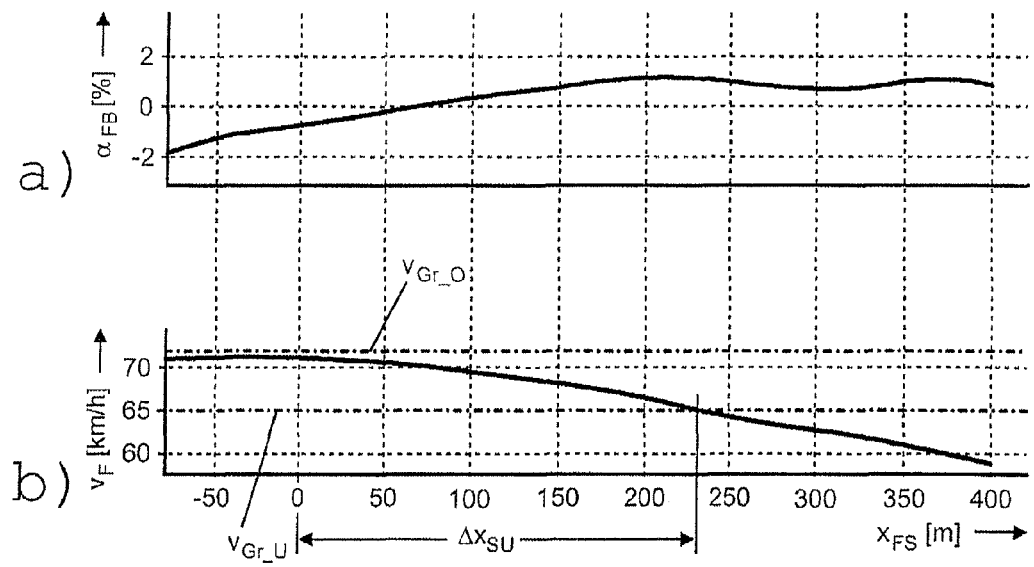
FIG. 5: An inclination profile of a road section lying ahead (FIG. 5a) and a speed profile calculated therefrom (FIG. 5b) with a fourth evaluation criterion for enabling coasting operation.

In contrast, in FIG. 5 a relatively steeply rising course of the road inclination $\alpha_{FB}(x_{FS})$ is determined in advance, which will lead to a relatively rapid fall of the calculated speed profile $v_F(x_{FS})$ and to reaching or falling below the lower speed limit $v_{Gr\_U}$ after a part-stretch $\Delta x_{SU}$ of about 230 meters. However, if this only takes place above a specified minimum number $n_{X\_Min\_U}$ of successive travel points, i.e. the part-stretch $\Delta x_{SU}$ is long enough for coasting operation, then in this case too the calculated speed profile $v_{XP}(x_{FS})$ is evaluated as positive.

Figure 6:
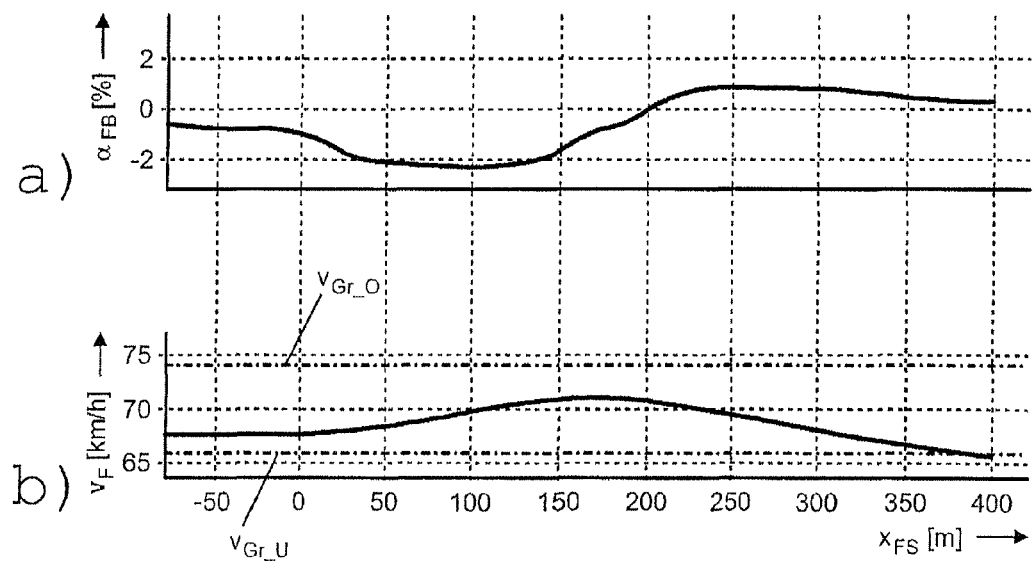
FIG. 6: An inclination profile of a road section ahead (FIG. 6a) with a depression and a speed profile calculated therefrom (FIG. 6b) with a criterion for terminating a coasting operation.

FIG. 6 shows a road inclination profile $\alpha_{FB}(x_{FS})$ and the speed profile $v_F(x_{FS})$ calculated from it which are typical for a depression. For the better utilization of the motor vehicle's kinetic energy the minimum number of successive travel points $n_{X\_Min}$ for enabling coasting operation is advantageously reduced if, with reference to the elevation profile of the road section ahead and/or the speed profile $v_F(x_{FS})$ calculated from it, a downhill start or the beginning of a depression is recognized. This leads to an earlier beginning of coasting operation. To obtain a higher driving speed uphill it is provided that coasting is terminated even before the lower speed limit $v_{Gr\_U}$ is reached by the calculated speed profile $v_F(x_{FS})$ if, with reference to the elevation profile of the road section lying ahead and/or the speed profile $v_F(x_{FS})$ calculated from it, an uphill stretch or the end of a depression is recognized.

INDEXES $n_{X\_Min}$ Minimum number of travel points
$n_{X\_Min\_O}$ Minimum number of travel points
$n_{X\_Min\_U}$ Minimum number of travel points
$n_{X\_Ref}$ Reference number of travel points
$n_{XP\_Min\_O}$ Minimum number of travel points
$n_{XP\_Min\_U}$ Minimum number of travel points
$v_F$ Driving speed
$v_F(0)$ Current driving speed
$v_F(x_{FS})$ Calculated speed profile
$v_{XP}(x_{FS})$ Extrapolated speed profile
$v_{Gr\_O}$ Upper speed limit
$v_{Gr\_U}$ Lower speed limit
$v_{Lim}$ Statutory speed limit
$x_{FS}$ Road stretch
$\alpha_{FB}$ Road inclination
$\Delta v_O$ Upper speed difference
$\Delta v_U$ Lower speed difference
$\Delta v_{Tol\_O}$ Tolerated speed difference
$\Delta v_{Tol\_U}$ Tolerated speed difference
$\Delta x_{Mod}$ Adaptation stretch
$\Delta x_{EXO}$ Part-stretch in which $v_{Gr\_O}$ is exceeded
$\Delta x_{SU}$ Part-stretch until speed falls below $v_{Gr\_U}$
$\Delta x_{XPSO}$ Extrapolated part-stretch until $v_{Gr\_O}$ is exceeded
$dv_F/dt$ Gradient of the driving speed
$(dv_F/dt)_{Max\_O}$ Limit acceleration value
$(dv_F/dt)_{Max\_U}$ Limit deceleration value

The invention claimed is:

1. A method of controlling a driving mode of a motor vehicle, having a drive-train that is largely automated and comprises a drive motor, either an incrementally or a continuously adjustable transmission and at least one separator clutch arranged between the drive motor and the transmission, such that while driving, if certain operating conditions exist and a speed profile ($v_F(x_{FS})$) calculated with reference to topographical data and vehicle parameters for a road section lying ahead is suitable, the drive-train is disengaged and driving continues in a coasting mode until an occurrence of a termination signal, the method comprising the steps of:
determining a calculated speed profile ($v_F(x_{FS})$) for a case of immediate disengagement of the drive-train continually at successive, equidistant travel points along a driving stretch ($x_{FS}$);
evaluating the calculated speed profile ($v_F(x_{FS})$) in each case in relation to a lower speed limit ($v_{Gr\_U}$) and an upper speed limit ($v_{Gr\_O}$); and
only enabling coasting if, for a specified minimum number ($n_{X\_Min}$) of successive travel points, a result of the evaluation is, in each case, positive.

2. The method according to claim 1, further comprising the step of determining the minimum number ($n_{X_{Min}}$) of successive travel points for enabling coasting operation variably as a function of at least one of an elevation profile of the road section lying ahead and the calculated speed profile ($v_F(x_{FS})$), calculated from the elevation profile.

3. The method according to claim 2, further comprising the step of reducing the minimum number of successive travel points ($n_{X\_Min}$) for enabling the coasting operation starting from a standard value if, with reference to the at least one of the elevation profile of the road section ahead and the calculated speed profile ($v_F(x_{FS})$) calculated from the elevation profile, either a downhill start or a beginning of a depression is recognized.

4. The method according to claim 1, further comprising the step of during accelerator pedal operation, defining the lower speed limit ($v_{Gr\_U}=v_F(0)-\Delta v_U$) as a speed lower than the current actual driving speed ($v_F(0)$) by a specified lower speed difference ($\Delta v_U$) and defining the upper speed limit ($v_{Gr\_O}=v_F(0)+\Delta v_O$) as a speed higher than the actual driving speed ($v_F(0)$) by a specified upper speed difference ($\Delta v_O$).

5. The method according to claim 1, further comprising the step of during cruise control operation, defining the lower speed limit ($v_{Gr\_U}$) as a speed at which the cruise control would call for an engine torque and defining the upper speed limit ($v_{Gr\_O}$) as a speed at which the cruise control would call for a braking torque.

6. The method according to claim 1, further comprising the step of reducing at least the upper speed limit ($v_{Gr\_O}$) over a specified adaptation distance ($\Delta x_{Mod}$) to a statutory speed limit ($v_{Lim}$), if the statutory speed limit ($v_{Lim}$) is below the upper speed limit ($v_{Lim}<v_{Gr\_O}$) and begins within the road section lying ahead.

7. The method according to claim 1, further comprising the step of defining the evaluation result as positive if, within the road section ahead, the calculated speed profile ($v_F(x_{FS})$) does not fall below the lower speed limit ($v_{Gr\_U}$) and does not exceed the upper speed limit ($v_{Gr\_O}$).

8. The method according to claim 1, further comprising the step of defining the evaluation result as positive if, within the road section ahead, the calculated speed profile ($v_F(x_{FS})$) falls below the lower speed limit ($v_{Gr\_U}$) and then rises above the lower speed limit ($v_{Gr\_U}$) again, provided that a period below the lower speed limit ($v_{Gr\_U}$) lasts no longer than a specified, tolerable number ($n_{X\_Tol\_U}$) of successive travel points and is within a specified, tolerable speed difference ($\Delta v_{Tol\_U}$).

9. The method according to claim 1, further comprising the step of defining the evaluation result as positive if, within the road section ahead, the calculated speed profile ($v_F(x_{FS})$) rises above the lower speed limit ($v_{Gr\_O}$) and then falls below the lower speed limit ($v_{Gr\_O}$) again, provided that a period below the lower speed limit ($v_{Gr\_O}$) lasts no longer than a specified, tolerable number ($n_{X\_Tol\_O}$) of successive travel points and is within a specified, tolerable speed difference ($\Delta v_{Tol\_O}$).

10. The method according to claim 1, further comprising the step of defining the evaluation result as positive if, with a negative gradient of the calculated speed profile ($v_F(x_{FS})$) at an end of the road section ahead, the speed profile ($v_F(x_{FS})$) extrapolated linearly beyond the last travel point of the road section exceeds the lower speed limit ($v_{Gr\_U}$) for more than a specified minimum number ($n_{XP\_Min\_U}$) of successive travel points.

11. The method according to claim 1, further comprising the step of defining the evaluation result as positive if, with a positive gradient of the calculated speed profile ($v_F(x_{FS})$) at an end of the road section ahead, the speed profile ($v_F(x_{FS})$) extrapolated linearly beyond the last travel point of the road section exceeds the upper speed limit ($v_{Gr\_O}$) for more than a specified minimum number ($n_{XP\_Min\_O}$) of successive travel points.

12. The method according to claim 1, further comprising the step of defining the evaluation result as positive if, within the road section ahead, the calculated speed profile ($v_F(x_{FS})$) falls below the lower speed limit ($v_{Gr\_U}$) for more than a specified minimum number ($n_{X\_Min\_U}$) of successive travel points.

13. The method according to claim 1, further comprising the step of defining the evaluation result as positive if, within the road section ahead, the calculated speed profile ($v_F(x_{FS})$) is below the upper speed limit ($v_{Gr\_O}$) for more than a specified minimum number ($n_{X\_Min\_O}$) of successive travel points.

14. The method according to claim 1, further comprising the step of terminating coasting operation, under normal operating conditions, if either the actual driving speed ($v_F$) or the calculated speed profile ($v_F(x_{FS})$) reaches either the lower speed limit ($v_{Gr\_U}$) or the upper speed limit ($v_{Gr\_O}$).

15. The method according to claim 2, further comprising the step of terminating coasting operation, even before the calculated speed profile ($v_F(x_{FS})$) reaches the lower speed limit ($v_{Gr\_U}$) if, with reference to at least one of the elevation profile of the road section lying ahead and the speed profile ($v_F(x_{FS})$) calculated from the elevation profile, either an uphill slope or an end of a depression is recognized.

16. The method according to claim 1, further comprising the step of terminating coasting even before the calculated speed profile ($v_F(x_{FS})$) reaches either the lower speed limit ($v_{Gr\_U}$) or the upper speed limit ($v_{Gr\_O}$) if, an intersection gradient ($dv_F/dt$) of the calculated speed profile ($v_F(x_{FS})$) either falls below a specified deceleration limit value (($dv_F/dt)_{Max\_U}$) or exceeds a specified acceleration limit value (($dv_F/dt)_{Max\_O}$).

17. The method according to claim 1, further comprising the step of shifting the transmission to neutral at a beginning of the coasting operation in the case of a coasting operation that is to be expected on the basis of the calculated speed profile ($v_F(x_{FS})$) and which extends over more than a specified reference number ($n_{X\_Ref}$) of successive travel points, whereas in contrast, if the coasting operation is expected to extend over fewer successive travel points than the specified reference number ($n_{X\_Ref}$), only the separator clutch is disengaged when coasting begins.

18. The method according to claim 1, further comprising the step of determining, in each case, the calculated speed profile ($v_F(x_{FS})$) for either a road section ahead with a length of between about 300 to about 500 meters long.

19. The method according to claim 1, further comprising the step of determining, in each case, the calculated speed profile ($v_F(x_{FS})$) for either a road section ahead with a length of about 400 meters long.

20. The method according to claim 1, further comprising the step of repeating the determination of the calculated speed profile ($v_F(x_{FS})$) at equidistant driving stretch intervals of between about 3 and 5 meters.

* * * * *